(12) United States Patent
Bayer et al.

(10) Patent No.: US 11,929,211 B2
(45) Date of Patent: Mar. 12, 2024

(54) MULTI-LAYER CAPACITOR

(71) Applicant: TDK Electronics AG, Munich (DE)

(72) Inventors: Thorsten Bayer, Deutschlandsberg (AT); Michael Schossmann, Frauental a.d. Lasnitz (AT)

(73) Assignee: TDK Electronics AG, Munich (DE)

( * ) Notice: Subject to any disclaimer, the term of this patent is extended or adjusted under 35 U.S.C. 154(b) by 30 days.

(21) Appl. No.: 17/638,696

(22) PCT Filed: Jul. 15, 2021

(86) PCT No.: PCT/EP2021/069757
§ 371 (c)(1),
(2) Date: Feb. 25, 2022

(87) PCT Pub. No.: WO2022/013352
PCT Pub. Date: Jan. 20, 2022

(65) Prior Publication Data
US 2022/0336153 A1 Oct. 20, 2022

(30) Foreign Application Priority Data

Jul. 16, 2020 (DE) ..................... 10 2020 118 857.9

(51) Int. Cl.
*H01G 4/30* (2006.01)
*H01G 4/008* (2006.01)
(Continued)

(52) U.S. Cl.
CPC ............. *H01G 4/30* (2013.01); *H01G 4/0085* (2013.01); *H01G 4/012* (2013.01);
(Continued)

(58) Field of Classification Search
CPC ........ H01G 4/30; H01G 4/0085; H01G 4/012; H01G 4/1227; H01G 4/1245; H01G 4/2325; H01G 4/38; H01G 4/12
(Continued)

(56) References Cited

U.S. PATENT DOCUMENTS

2006/0055288 A1   3/2006  Heinzmann
2006/0238073 A1  10/2006  Ragossnig
(Continued)

FOREIGN PATENT DOCUMENTS

DE   10234787 C1  10/2003
DE   10307825 A1   9/2004
(Continued)

OTHER PUBLICATIONS

International Search Report and Written Opinion of International Searching Authority corresponding to International Patent Application No. PCT/EP2021/069757, with English translation of the Search Report, dated Nov. 10, 2021 (12 pages).

*Primary Examiner* — Arun Ramaswamy
(74) *Attorney, Agent, or Firm* — Nixon Peabody LLP

(57) ABSTRACT

A multi-layer capacitor including a capacitor element having at least two segments. Each segment includes multiple layer planes, including ceramic dielectric layers and electrode layers arranged therebetween, which are arranged in a layer sequence one above the other. The electrode layers include different electrodes, including at least first and second electrodes. The different electrodes overlap in active regions but not in passive regions. Multiple segments are arranged one above the other in a stack direction. The outermost dielectric layers of two segments form a connection region in which the segments are fixedly connected to each other parallel to
(Continued)

Figure 1:
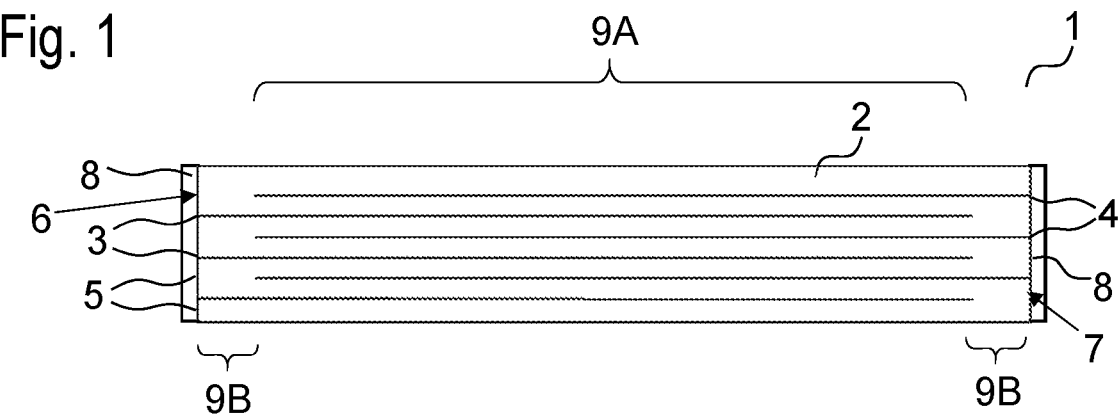

the layer planes. The connection region contains a relief region. The relief region occupies at least the entire passive region of the capacitor.

30 Claims, 9 Drawing Sheets

(51) Int. Cl.
*H01G 4/012* (2006.01)
*H01G 4/12* (2006.01)
*H01G 4/232* (2006.01)
*H01G 4/38* (2006.01)

(52) U.S. Cl.
CPC ......... *H01G 4/1227* (2013.01); *H01G 4/1245* (2013.01); *H01G 4/2325* (2013.01); *H01G 4/38* (2013.01)

(58) Field of Classification Search
USPC .................................. 361/301.4, 321.1, 329
See application file for complete search history.

(56) References Cited

U.S. PATENT DOCUMENTS

| | | | |
|---|---|---|---|
| 2007/0014075 A1* | 1/2007 | Ritter | H01G 4/30 361/306.3 |
| 2008/0291602 A1 | 11/2008 | Devoe | |
| 2010/0243307 A1 | 9/2010 | McConnell et al. | |
| 2011/0252614 A1* | 10/2011 | Prymak | H01G 4/30 29/25.41 |
| 2013/0208399 A1* | 8/2013 | Morita | H01G 4/30 361/301.4 |
| 2015/0124372 A1 | 5/2015 | Park | |
| 2015/0170842 A1 | 6/2015 | An et al. | |
| 2015/0294792 A1 | 10/2015 | Schossmann et al. | |
| 2015/0302989 A1 | 10/2015 | Choi | |
| 2015/0371778 A1 | 12/2015 | Engel | |
| 2016/0020028 A1 | 1/2016 | Katsuta | |
| 2016/0190424 A1 | 6/2016 | Galler | |
| 2017/0029337 A1 | 2/2017 | Imura et al. | |
| 2017/0032893 A1 | 2/2017 | Tauchi et al. | |
| 2017/0190627 A1 | 7/2017 | Tauchi | |
| 2017/0243696 A1 | 8/2017 | Hirose | |
| 2017/0358397 A1 | 12/2017 | McConnell et al. | |
| 2018/0012706 A1 | 1/2018 | Bultitude | |
| 2018/0047507 A1 | 2/2018 | Koini | |
| 2018/0211781 A1 | 7/2018 | Imura | |
| 2018/0247768 A1 | 8/2018 | Koini | |
| 2019/0043669 A1* | 2/2019 | Trinh | H01G 4/35 |
| 2019/0267193 A1 | 8/2019 | Beck et al. | |
| 2019/0279820 A1 | 9/2019 | Horn et al. | |
| 2019/0304702 A1 | 10/2019 | Koini | |
| 2020/0411244 A1 | 12/2020 | Koini | |

FOREIGN PATENT DOCUMENTS

| | | |
|---|---|---|
| DE | 102012111023 A1 | 5/2014 |
| DE | 102013102278 A1 | 9/2014 |
| DE | 102016110742 A1 | 12/2017 |
| EP | 3107880 B1 | 1/2020 |
| GB | 2337825 A | 12/1999 |
| GB | 2337854 A | 12/1999 |
| JP | 2008-109020 A | 5/2008 |
| JP | 2012-522382 A | 9/2012 |
| JP | 2015-137193 A | 7/2015 |
| JP | 2015-137194 A | 7/2015 |
| JP | 2015-207750 A | 11/2015 |
| JP | 2015-535145 A | 12/2015 |
| JP | 2016-197645 A | 11/2018 |
| JP | 2019-525522 A | 9/2019 |
| WO | WO 2014/075846 A1 | 5/2014 |
| WO | WO-2016189005 A1 * | 12/2016 ........... C04B 35/462 |

* cited by examiner

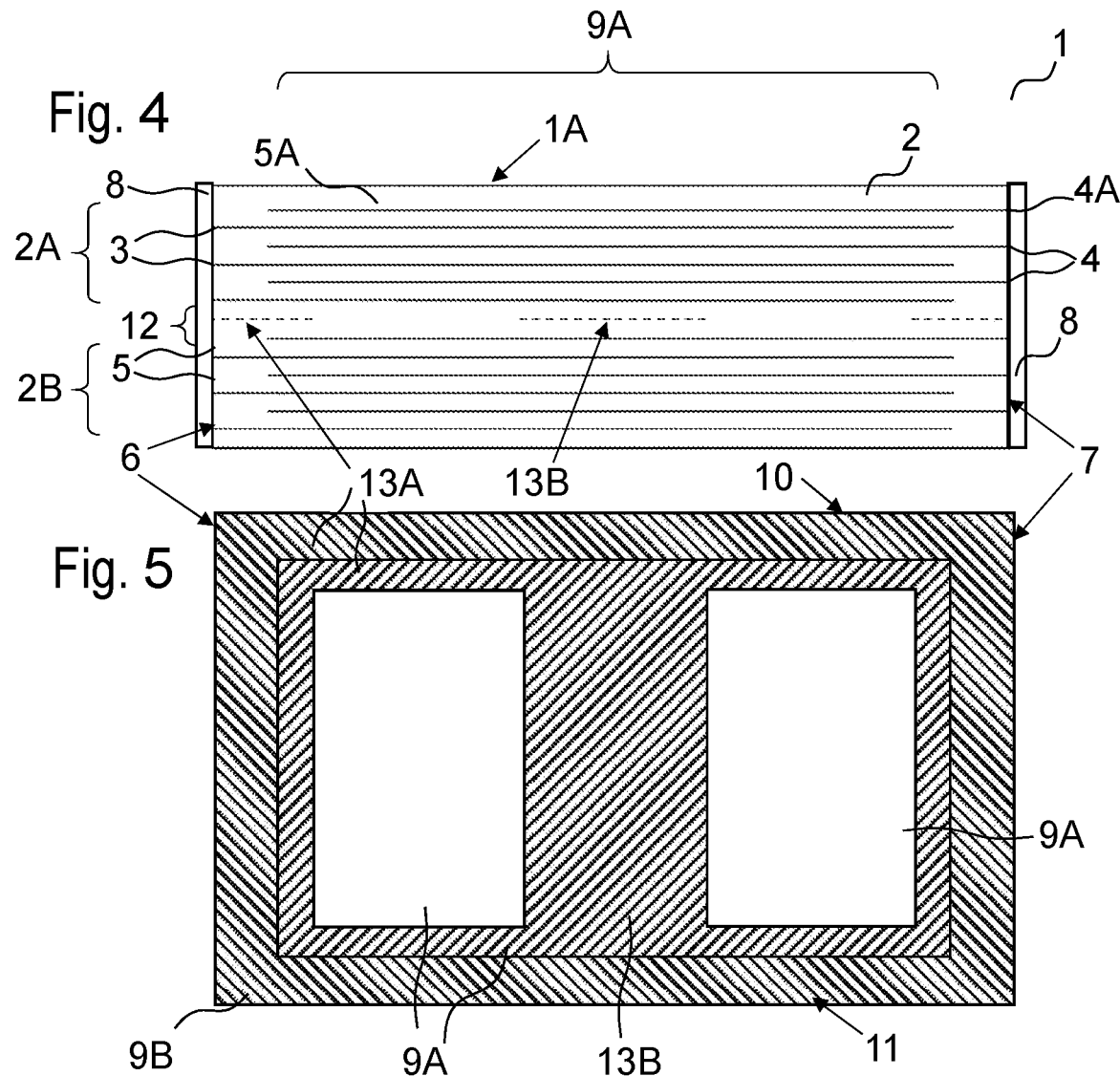

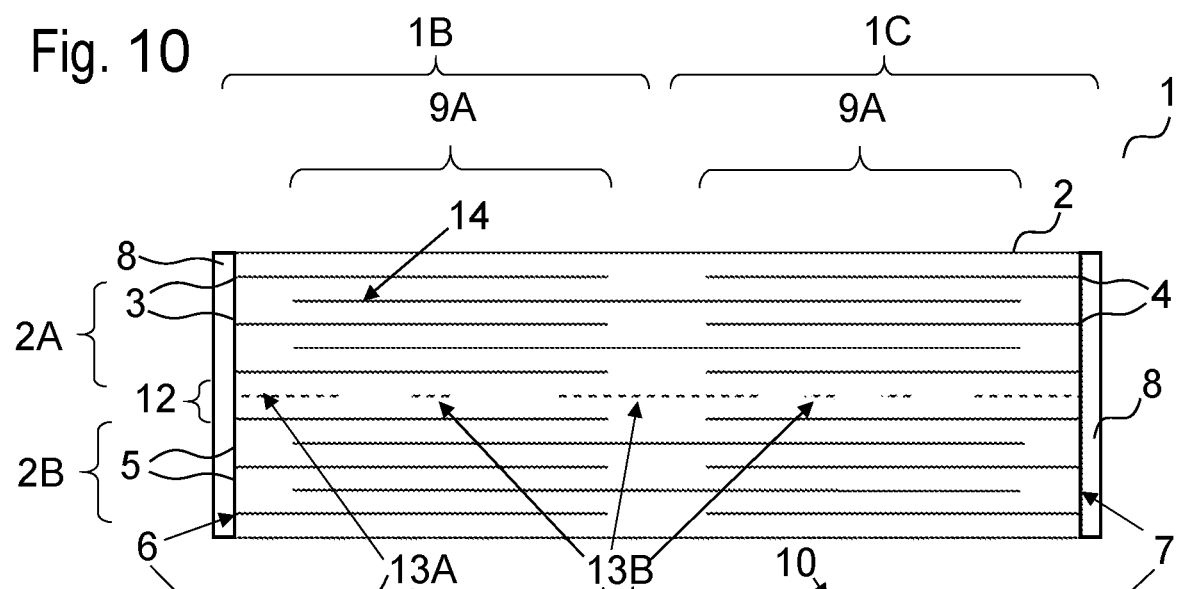
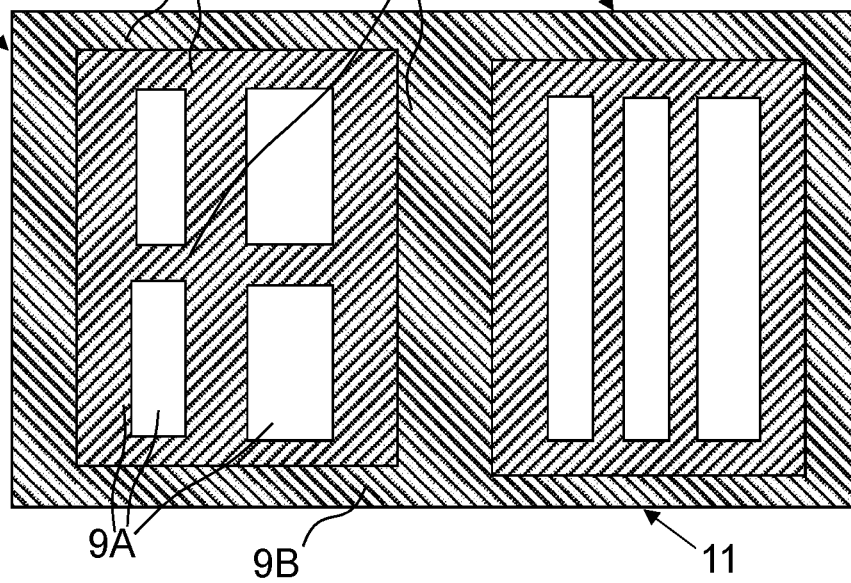

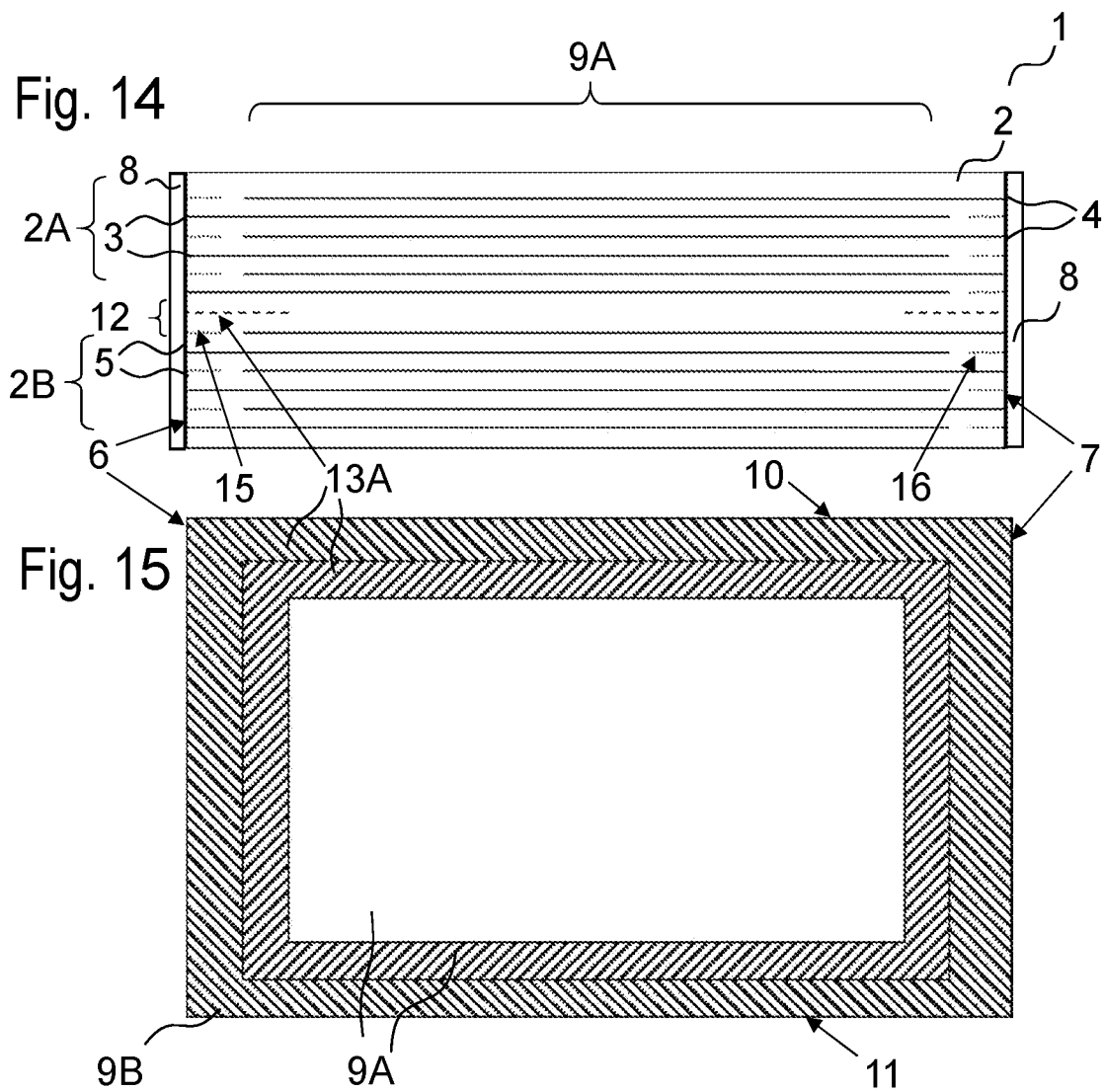

MULTI-LAYER CAPACITOR

CROSS-REFERENCE TO RELATED APPLICATIONS

This application is a U.S. National Stage of International Application No. PCT/EP2021/069757, filed Jul. 15, 2021, which claims the benefit of German Patent Application No. 102020118857.9, filed Jul. 16, 2020, both of which are incorporated herein by reference in their entireties.

The present invention relates to a ceramic-based multi-layer capacitor comprising dielectric layers and electrodes disposed therebetween.

Examples of multilayer capacitors are known to those skilled in the art.

In ceramic-based multilayer capacitors with piezoelectric properties, deformations of the electrical ceramic material generally occur when the capacitor voltage is applied.

Regular deformations can lead to material fatigue and subsequently to fracture of the ceramic material.

In addition, the known multilayer capacitors exhibit various other technical problems in application.

It is therefore a task of the present invention to provide a multilayer capacitor with improved material properties and improved geometry.

The task is at least partially solved by the multilayer capacitor disclosed in claim 1.

Further embodiments can be found in the further claims.

Disclosed is a multilayer capacitor comprising a capacitor element having at least two segments. The segments have dielectric layers of ceramic and electrode layers arranged therebetween, which are arranged one above the other in a layer sequence. The electrode layers here comprise different electrodes, including at least first and second electrodes.

The different electrodes, for example first and second electrodes, overlap in active regions. The regions where different electrodes do not overlap are called passive regions.

In a passive region, for example, only electrodes of the same type overlap, that is, only first electrodes or only second electrodes or only any other uniform type of electrodes.

Additionally or alternatively, a passive region may be a region of the capacitor element in which no electrodes are located. Such a region may be, for example, an edge region adjacent to an outer surface of the capacitor element, since the electrodes usually do not extend across the entire width of the capacitor element.

Within the capacitor element, a number of segments are arranged one above the other in the stacking direction, with the outermost dielectric layers of two segments forming a connection region in which the segments are firmly connected to one another parallel to the layer planes. The connection region is formed, for example, by the lowermost dielectric layer of an upper segment and the uppermost dielectric layer of a lower segment.

The two dielectric layers are firmly connected to each other by sintering, for example. By sintering the superimposed segments together, the adjacent dielectric layers are physically and chemically bonded to each other.

Any number of segments can be bonded together. A connection region is formed between every two segments.

The connecting region includes a relief region arranged in a plane parallel to the electrodes. The relief region occupies at least the entire passive region of the capacitor.

In the relief region, the connection of the segments is weakened or interrupted. The relief region keeps mechanical stresses in the multilayer capacitor low. Preferably, the thickness of the segments is so small that mechanical stresses in the segments do not lead to the formation of cracks in the capacitor.

Preferably, this weakening is pronounced in the stacking direction, which corresponds to the field direction of the capacitor. The weakening can be achieved by forming a gap or using materials of different elastic moduli, preferably materials of lower elastic modulus values. Alternatively, weakening can be achieved by inserting a material that is harder or more brittle than the ceramic. In the event of stress, this material may fracture.

Such mechanical stresses occur, for example, when the capacitor voltage is applied. In particular, mechanical stresses are to be expected between active regions and passive regions, since these are subjected to different electrical loads. If no relief regions were provided within the capacitor, such stresses would accumulate unhindered over the entire capacitor.

By weakening or interrupting the connection of the segments, especially in the passive regions, the mechanical stresses are prevented from adding up in such a way as to cause fractures or cracks in the capacitor.

In one embodiment, the relief region is formed as a region between the segments and parallel to the layer planes, in which the segments are not firmly connected to each other.

This can easily achieve the described weakening of the connection between the segments.

In one embodiment, the relief region is structured. In particular, the relief region may comprise at least one recess. For example, a connection region is formed within this recess in which the segments are firmly connected to one another, in particular firmly sintered to one another.

In one embodiment, the relief region is formed as a gap between the segments.

In particular, the dielectric layers of the various segments may be spaced apart from one another in the relief region. The dielectric layers may also be adjacent to each other in the relief region and not bonded to each other, or only partially bonded to each other, or only bonded to each other with reduced adhesive strength.

In at least one embodiment, the gap between the segments is less wide than the thickness of a dielectric layer. The individual layer planes of a capacitor element generally each have the same layer thicknesses.

In one embodiment of the multilayer capacitor, the relief region comprises a material whose Young's modulus is different from the Young's modulus of the dielectric layers.

For the manufacture of the multilayer capacitor, green films, in particular ceramic green films, are provided for forming the dielectric layers. On at least one green film, which later forms an outer dielectric layer of a segment, a first paste comprising, for example, an organic or inorganic material is applied, for example printed. The first paste is preferably applied only at the points where relief regions are provided.

The second, metallic paste for an electrode material is printed onto further green films, which later form inner dielectric layers of a segment. The printing and layering can be done by alternately applying the electrodes in the stack slightly offset from each other so that they can later be contacted in a comb-like manner on one side at their respective exit surfaces.

The green films are arranged into a stack which is sintered. Preferably, the first paste is formed in such a way that at the points where the first paste is applied, sintering together of the dielectric layers is prevented in whole or in part, so that a relief region is formed here.

The layered and pressed stack can then be cut into the individual capacitors in the case of a mass production process.

After cutting, the binder is first baked out of the separated capacitors (debinding). This is followed by the firing process (sintering). In this process, the ceramic powder is sintered at temperatures preferably between 900° C. and 1200° C. and acquires its final, predominantly crystalline structure. The individual dielectric layers combine during the process to form a monolithic structure. The dielectric layers of the segments arranged one above the other are also firmly bonded together.

Only this firing process gives the ceramic its desired dielectric behavior. The firing process is followed by a cleaning step and, in at least one embodiment, subsequently by the application of the external contacting.

In one embodiment, the relief region is pronounced at least in all regions adjacent to outer sides of the capacitor element.

In one embodiment, the depth to which the relief region extends into the capacitor element from the exterior is approximately the stack height of the segments adjacent to the relief region or the dimension between the uppermost and lowermost electrodes in an adjacent segment. The adjacent segments generally each have the same stack height.

In another embodiment, the depth of the passive region on the outside of the capacitor is approximately the stack height of the adjacent segments.

In one embodiment, the depth to which the relief region extends into the capacitor element from the outside is twice the depth of the passive region on the outside of the capacitor. Thus, the depth of the relief region depends on the depth of the passive region.

Such a dimension of the relief region avoids that the mechanical stresses add up in such a way that cracks or similar fatigue phenomena occur in the capacitor.

Additionally or alternatively, in one embodiment, the relief region may include other sections that are not directly pronounced on the outer surfaces of the capacitor element. The dimensions of the relief region should again be at least correspond to the dimensions described in the last paragraph.

In one embodiment, the relief region is at least partially arranged in a region where the different electrodes overlap. Thus, the relief region is at least partially pronounced in an active region of the capacitor element.

The relief region in this embodiment further comprises all regions of the connection region that are arranged in a passive region of the capacitor element.

Such an enlarged relief region further reduces mechanical stresses between the individual segments.

In one embodiment, the relief region includes at least one section that is not adjacent to the outer surfaces of the capacitor element.

In one embodiment, the connection region comprises a plurality of relief regions that are distinct from one another.

In one embodiment, the connection region comprises a plurality of relief regions that are delimited from each other and that are at least partially not adjacent to the outer sides of the capacitor element.

The latter three embodiments are particularly advantageous for large capacitor diameters.

Such an enlarged relief region or multiple relief regions in a joint region further reduce the mechanical stresses between the individual segments.

In one embodiment of the multilayer capacitor, the first and second electrodes at least partially overlap.

In their overlap region, the first and second electrodes form an active region in which an electric field acts to generate mechanical stresses within the dielectric layers.

In one embodiment, the electrodes comprise one or more of the group of copper, silver, nickel, platinum and palladium. These metals are particularly suitable due to their high electrical conductivity.

For ease and cost of fabrication, it is preferred that the entire multilayer capacitor be sintered in one step as described above. The sintering step thus takes place after the stacking of the individual layers.

To enable such a process, the sintering temperature of the ceramic used for the dielectric layers must not exceed the melting temperature of the metals used for the electrodes. This can be achieved by selecting a suitable electrode metal or ceramic.

In at least one embodiment, two separate external contacts for contacting the first and second electrodes, are applied to exit surfaces on the outside of the capacitor element where electrodes exit the capacitor element.

The outer contacts are preferably applied to opposite outer surfaces of the multilayer capacitor.

Possible third or further electrodes, on the other hand, are not contacted by the outer contacts.

In one embodiment of the multilayer capacitor, each segment comprises at least three different types of electrode layers, wherein in a first electrode layer the first and the second electrodes are formed opposite to each other and are spaced apart by a dielectric section, in a second electrode layer only first electrodes are formed, and in a third electrode layer only second electrodes are formed, and wherein the first electrode layers respectively form the outermost electrode layers of each segment in the stacking direction.

The first electrodes and the second electrodes are opposed to each other in the first electrode layer in a direction perpendicular to a stacking direction of the multilayer capacitor. Dielectric layers are respectively formed between the electrode layers.

Advantageously, in the described embodiment, since the first and second electrodes each have the same electric polarization as the adjacent outer contacts, no electric field builds up in the outer portions of the segments or between two segments.

This is reinforced by the fact that the electrodes of the first electrode layers are also partially adjacent within the segment with electrodes of the same electrical polarization. Thus, no electric field builds up in a comparatively large region. Thus, even individual layers within the active region of the segments do not exhibit an electric field.

Thus, an unwanted migration of charged particles from the outside into the interior of the capacitor can be avoided. This has the advantage of higher resistance to moisture induced material change.

In one embodiment, the multilayer capacitor comprises at least one third electrode that is not contacted by any of the external contacts, wherein the third electrode layer overlaps with the first and second electrodes.

Such an electrode is also referred to as a "floating" electrode.

In one embodiment, the multilayer capacitor comprises at least one third electrode that is not adjacent to any of the outer sides of the capacitor element.

Preferably, the multilayer capacitor, and in particular each segment of the multilayer capacitor, comprises a plurality of first electrodes, a plurality of second electrodes, and a plurality of third electrodes.

In one embodiment, the capacitor comprises at least one series connection of two capacitances. In particular, a first capacitance may be formed by overlapping at least one first electrode with at least one third electrode, and a second capacitance may be formed by overlapping at least one second electrode with the at least one third electrode.

In one embodiment, the multilayer capacitor comprises further electrodes arranged in the passive region of the capacitor and not overlapping with any electrodes of a different polarity.

Thus, no electric field is established between these electrodes. Such electrodes are called passive or dummy electrodes.

Such dummy electrodes reduce mechanical stresses that typically occur between regions with electrodes and regions without electrodes within the capacitor element.

The combined use of dummy electrodes and relief regions can thus minimize mechanical stresses in the multilayer capacitor and increase the robustness of the capacitor. The thermomechanical and electrical load capacity of the multilayer capacitor can thus be optimized.

In another embodiment, the external contacts comprise a multilayer sputter layer comprising layers consisting of chromium, nickel and at least one of silver or gold, the layers being deposited on the exit surfaces in that order.

The chromium layer, which is applied directly to the exit surface, provides high adhesion of the sputter layer to the exit surface. The layer of silver or gold exhibits high conductivity and thus serves primarily to provide electrical contact between the electrodes. By the described sputter layer, all electrodes of one type can be electrically connected to each other and thus be connected in parallel.

The middle layer of nickel serves as a diffusion barrier.

For example, all first electrodes that all exit the capacitor element at the same first surface can be electrically connected to each other via a first sputter layer. Further, all of the second electrodes, which all exit at a second surface, may be electrically connected or connected in parallel via another second sputter layer, such that, for example, the entire stack comprising all of the first electrodes and all of the second electrodes forms a single multilayer capacitor.

In one embodiment, the outer contacts further comprise a fine mesh copper grid deposited on the sputter layer.

The copper grid covers the entire sputter layer. Thus, the copper grid can prevent the formation of cracks in the sputter layer or even the crumbling of the sputter layer in case of mechanical deformations of the capacitor element.

In one embodiment, the external contacts further comprise metal sheets by which the capacitor element is contacted to the outside. The metal sheets are attached to the sputter layer.

In one embodiment, the metal sheets are attached to the sputter layer by a solder joint.

In another embodiment, the metal sheets are attached to the sputter layer by means of a sintered silver layer.

While the described sputter layer usually has a thickness in the nanometer range, the silver layer has a thickness in the micrometer range. Such a sintered silver layer covering the entire sputter layer holds the sputter layer together in case of deformations of the capacitor element and prevents, for example, crumbling of the sputter layer.

The silver layer further attaches the metal sheets to the sputter layer. Thus, no further solder joints are necessary.

For this purpose, the silver is applied to the sputter layer and the metal sheets are placed directly on top. Only after the metal sheets have been placed is the silver layer sintered at the lowest possible pressure.

In at least one embodiment, the silver layer is sintered at such a low pressure that a residual porosity of about 35% is achieved.

Such porosity is low enough to only slightly reduce the electrical and thermal conductivity of the silver. Due to its high electrical and thermal conductivity, the silver layer further enables good electrical bonding of the metal sheets to the sputter layer. In addition, however, silver with the aforementioned porosity exhibits sufficiently high ductility to ensure thermomechanical relief.

Furthermore, a sintered silver layer exhibits lower material fatigue under mechanical or thermomechanical stress compared to, for example, soldered layers.

Since the process temperatures in sintering are generally lower than in soldering, lower thermomechanical stresses continue to occur and the process can be carried out relatively simply and inexpensively.

The high melting point of the sintered silver of a maximum of 962° C. in the case of pure silver guarantees high temperature stability of the silver layer, which enables further process steps at high temperatures.

In one embodiment, the metal sheets comprise two copper layers and an invar layer arranged in between.

Copper exhibits particularly good electrical and thermal conductivity.

Invar is the name given to an iron-nickel alloy with approximately ⅓ nickel and ⅔ iron. This material has a particularly low coefficient of thermal expansion. In particular, the coefficient of thermal expansion is close to the coefficient of expansion of ceramics. Due to the combination with copper, sufficient conductivity of the terminal contact can be ensured despite a low electrical conductivity of the Invar.

As an alternative to Invar, other iron-nickel or iron-nickel-cobalt alloys can also be used.

To produce the metal sheet described, copper layers are rolled onto an Invar sheet, for example.

The outer surfaces of the copper layers may be silver-plated to improve bonding between the copper and the sintered silver layer. In one embodiment, the silver plating is applied by electroplating.

In one embodiment, the metal sheets of the outer contacts comprise a copper layer with a meandering geometry.

The copper layer is applied directly to the silver layer. The copper layer preferably has a meandering, lattice-like geometry. The copper layer may also be silver-plated. The silver plating is preferably carried out by electroplating. The copper layer can be sintered directly to the silver layer.

Copper is preferably used for the external contacting of the capacitor due to its excellent thermal and electrical conductivity.

In one embodiment, the multilayer capacitor comprises separable capacitor elements that can be assembled and disassembled as desired at a contact region, the contact region being arranged normal to the layer planes and the external contacts.

Thus, a multilayer capacitor of any size can be flexibly constructed. The capacitor elements described can be mass-produced in a uniform size and then assembled as required.

The individual capacitor elements can be fixed, for example, by means of a sintered silver layer applied to the outer surfaces, which extends over the outer surfaces of all the capacitor elements and thus holds them together.

In one embodiment, the ceramic is an anti-ferroelectric dielectric.

The dielectric layers may exhibit piezoelectric or electrostrictive behavior, such that when a voltage is applied to the multilayer capacitor, deformation of the layers occurs.

In one embodiment, the ceramic comprises a lead zirconate titanate. This typically crystallizes in a perovskite structure. Such a ceramic is an anti-ferroelectric dielectric, which can advantageously be used in the multilayer capacitor described.

In one embodiment, the ceramic has the following composition, which has advantageous properties when used in the capacitor:

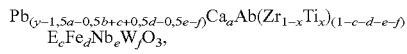

wherein A is selected from the group consisting of Na, K, and Ag; E is selected from the group consisting of Cu, Ni, Hf, Si, and Mn; and $0.05 \leq x \leq 0.3$;

$0 < a < 0.14$;

$0 \leq b \leq 0.12$;

$0 \leq c \leq 0.12$;

$0 \leq d \leq 0.12$;

$0 \leq e \leq 0.12$;

$0 \leq f \leq 0.12$;

$0.9 \leq y \leq 1.5$; and $0.001 < b+c+d+e+f$ applies.

The described ceramic exhibits a low sintering temperature between 900° C. and 1200° C. Furthermore, the ceramic features high durability and low material fatigue.

In one embodiment, the ceramic has the following composition, which has similar advantageous properties when used in the capacitor:

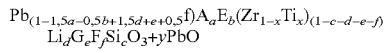

Wherein

A is selected from the group consisting of La, Nd, Y, Eu, Gd, Tb, Dy, Ho, Er and Yb;

E is selected from the group consisting of Na, K and Ag;

G is selected from the group consisting of Cu, Ni, Co and Mn; and $0.1 \leq x \leq 0.3$;

$0 < a \leq 0.12$;

$0 \leq b \leq 0.12$;

$0 \leq c \leq 0.12$;

$0 \leq d \leq 0.12$;

$0 < e \leq 0.12$;

$0 \leq f \leq 0.12$;

$0 \leq y \leq 1$; and $0 < b+d+e+f$ applies.

In another embodiment, the ceramic has the following composition, which has similar advantageous properties when used in the capacitor:

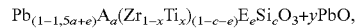

wherein

A is selected from the group consisting of La, Nd, Y, Eu, Gd, Tb, Dy, Ho, Er and Yb;

E is selected from the group consisting of Cu and Ni; and $0.05 \leq x \leq 0.3$;

$0 < a \leq 0.12$;

$0 \leq c \leq 0.12$;

$0.001 \leq e \leq 0.12$; and $0 \leq y < 1$ applies.

In another embodiment, the ceramic comprises a sodium strontium titanate. Such a ceramic is also an anti-ferroelectric dielectric, which can advantageously be used in the multilayer capacitor described.

In one embodiment, the ceramic has the following composition, which has advantageous properties when used in the capacitor:

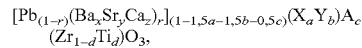

wherein X and Y each represent a rare earth metal selected from the group consisting of La, Nd, Y, Eu, Gd, Tb, Dy, Ho, Er and/or Yb; A represents a monovalent ion;

$x+y+z=1$;

$0 \leq x$;

$0 \leq y$;

$0 \leq z$;

$0 < r \leq 0.3$;

$0 < d \leq 1$;

$0 < a \leq 0.2$;

$0 \leq b \leq 0.2$; and $0 < c \leq 0.2$ applies.

In another embodiment, the ceramic has the following composition, which also has advantageous properties when used in the capacitor:

where $0.10 \leq a \leq 0.65$;

$0 < b \leq 0.45$;

$0 < c \leq 0.85$;

$0 < d < 0.20$; and $0.95 \leq a+b+c \leq 1.05$ applies.

In another embodiment, the ceramic has the following composition, which also has advantageous properties when used in the capacitor:

$$(Bi_aNa_bSr_c)(Zn_dTi_{1-d})O_3,$$

where $$0.09 \leq a \leq 0.58,$$

$$0.09 \leq b \leq 0.42,$$

$$0.05 \leq c \leq 0.84;$$

$$0 < d \leq 0.08; \text{ and}$$

$$0.95 \leq a+b+c \leq 1.05$$

applies.

In addition to the above compositions, other compositions are possible which are not explicitly mentioned.

The capacitor with above properties is suitable for use as a DC link or snubber capacitor.

Due to the properties of the capacitor, it is possible in some applications to dispense with an additional snubber capacitor when used as a DC link capacitor.

Another application of the capacitor described is as a filter capacitor. Due to its high-frequency properties, interference signals can be well attenuated and filtered up into the MHz range.

The invention is described in detail below with reference to examples of embodiments. The invention is not limited to the examples listed.

The figures show:

FIG. 1: Side view of a schematic representation of a first embodiment of the multilayer capacitor not according to the invention comprising first and second electrodes in a segment.

Figure 2:
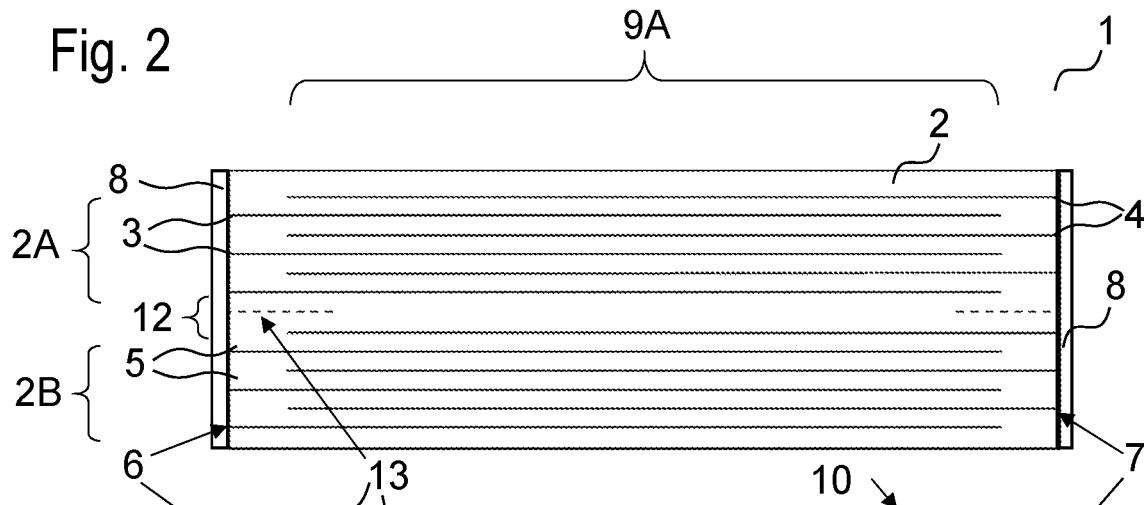

FIG. 2: Side view of a schematic representation of a second embodiment of the multilayer capacitor comprising first and second electrodes in two segments.

Figure 3:
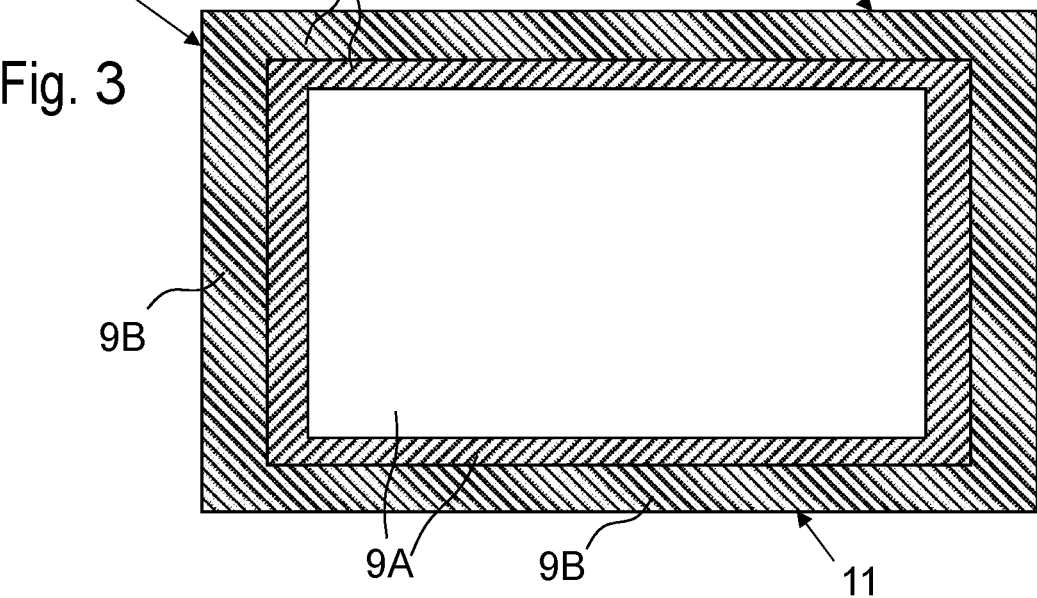

FIG. 3: Top view of a schematic representation of a second embodiment of the multilayer capacitor comprising first and second electrodes in two segments.

FIG. 4: Side view of a schematic representation of a third embodiment of the multilayer capacitor comprising first and second electrodes in two segments.

FIG. 5: Top view of a schematic representation of a third embodiment of the multilayer capacitor comprising first and second electrodes in two segments.

Figure 6:
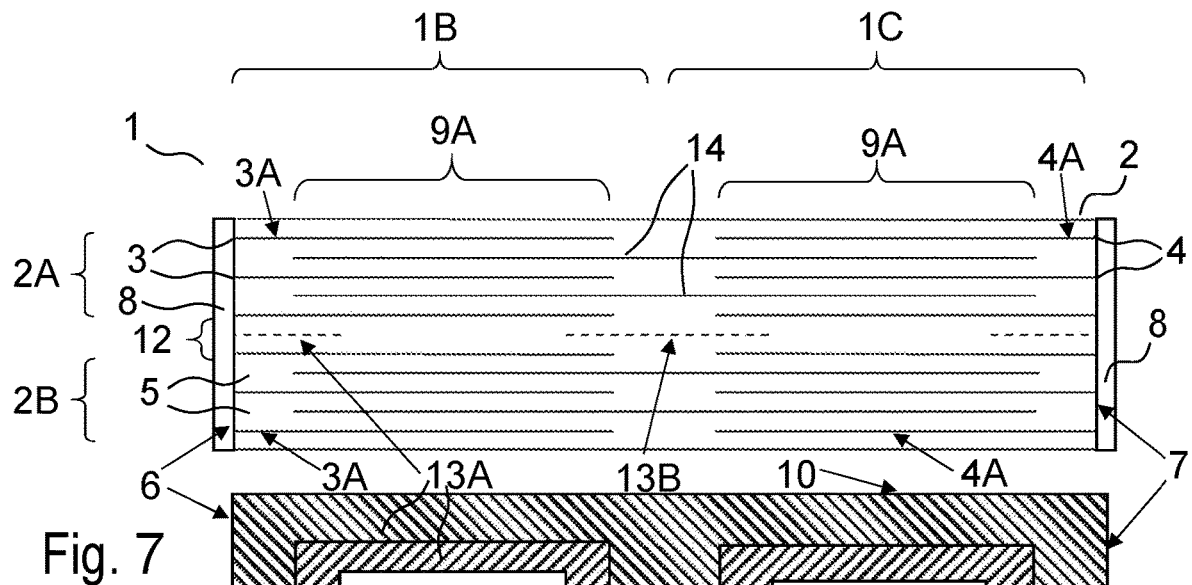

FIG. 6: Side view of a schematic representation of a fourth embodiment of the multilayer capacitor comprising first, second and third electrodes in two segments.

Figure 7:
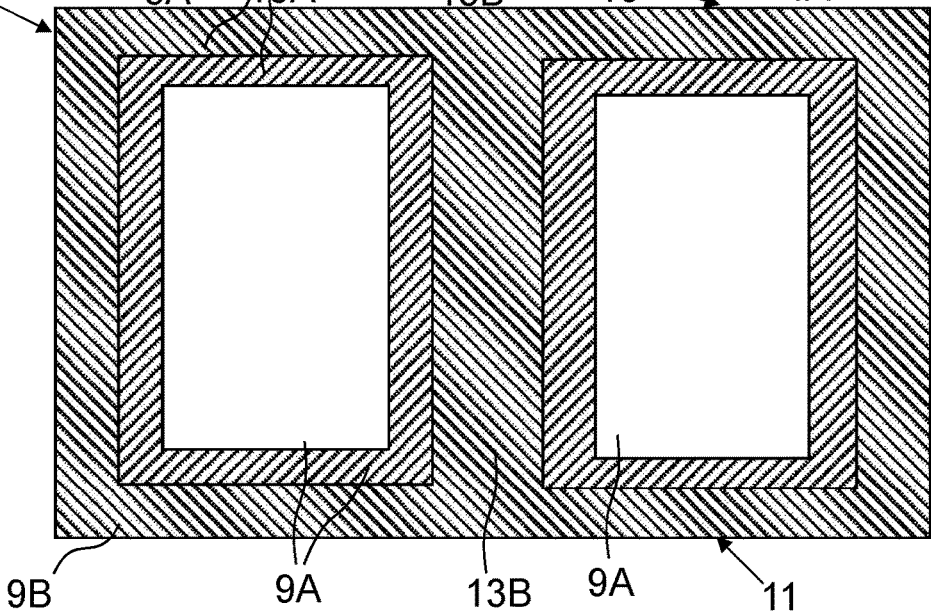

FIG. 7: Top view of a schematic representation of a fourth embodiment of the multilayer capacitor comprising first, second and third electrodes in two segments.

Figure 8:
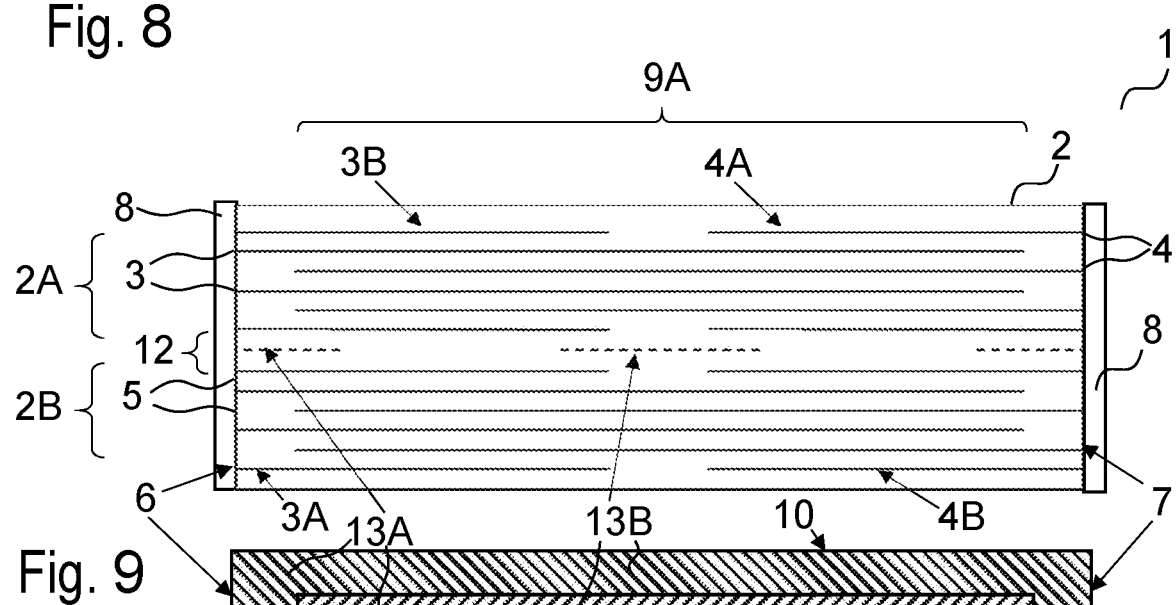

FIG. 8: Side view of a schematic representation of a fifth embodiment of the multilayer capacitor comprising first and second electrodes in two segments.

Figure 9:
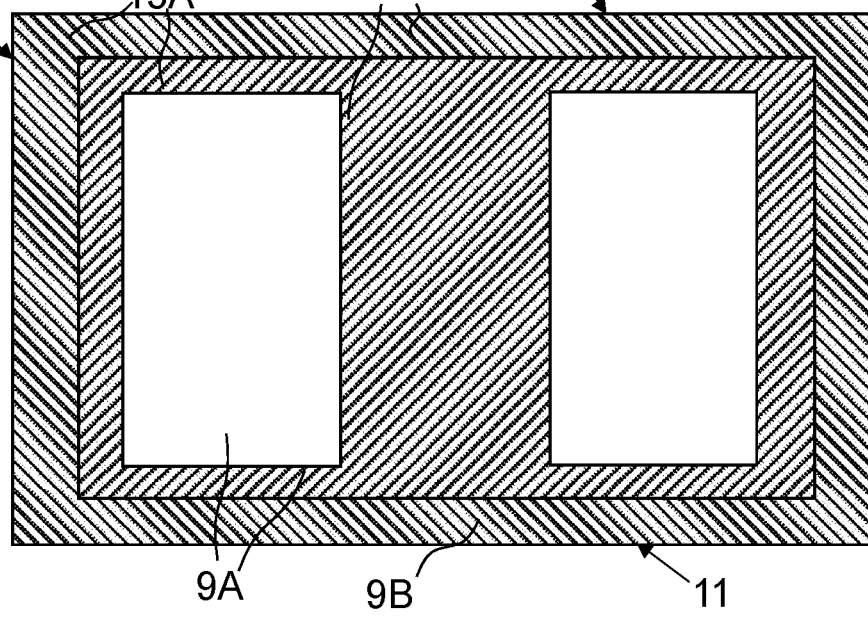

FIG. 9: Top view of a schematic representation of a fifth embodiment of the multilayer capacitor comprising first and second electrodes in two segments.

FIG. 10: Side view of a schematic representation of a sixth embodiment of the multilayer capacitor comprising first and second electrodes in two segments.

FIG. 11: Top view of a schematic representation of a sixth embodiment of the multilayer capacitor comprising first and second electrodes in two segments.

Figure 12:
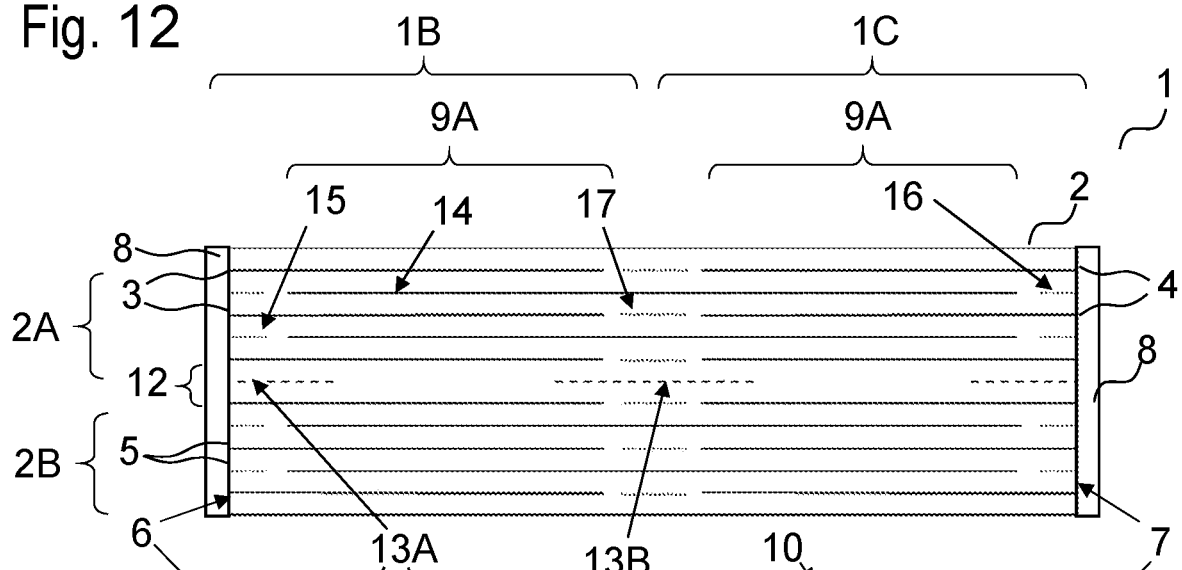

FIG. 12: Side view of a schematic representation of a seventh embodiment of the multilayer capacitor comprising first to sixth electrodes in two segments.

Figure 13:
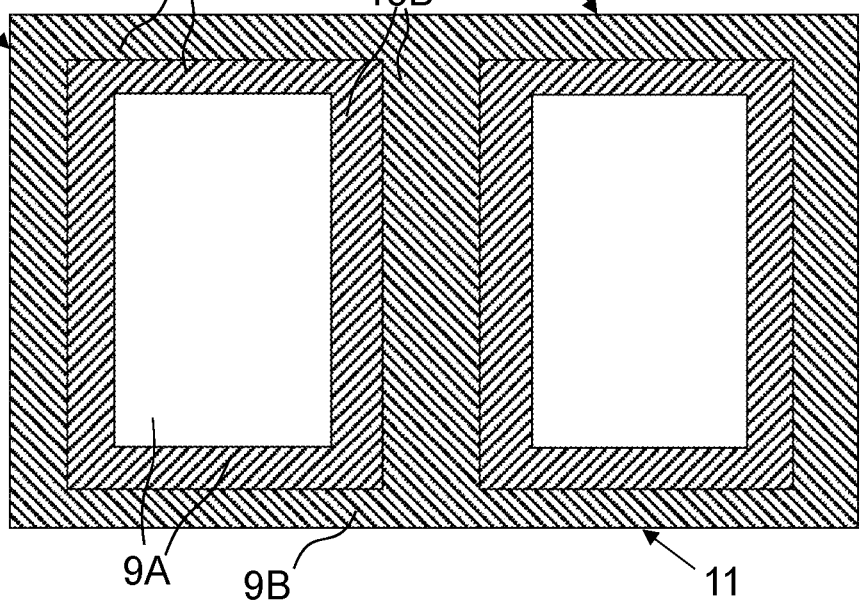

FIG. 13: Top view of a schematic representation of a seventh embodiment of the multilayer capacitor comprising first to sixth electrodes in two segments.

FIG. 14: Side view of a schematic representation of an eighth embodiment of the multilayer capacitor comprising first and second, and fourth and fifth electrodes in two segments.

FIG. 15: Top view of a schematic representation of an eighth embodiment of the multilayer capacitor comprising first and second, as well as fourth and fifth electrodes in two segments.

Figure 16:
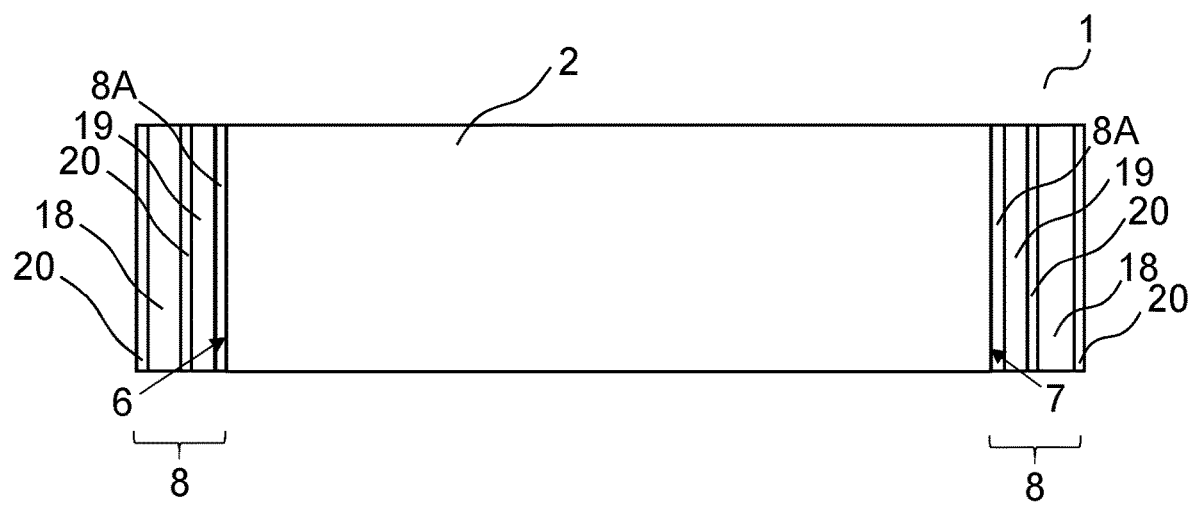

FIG. 16: Side view of a schematic representation of a ninth embodiment of the multilayer capacitor comprising external contacts.

Figure 17:
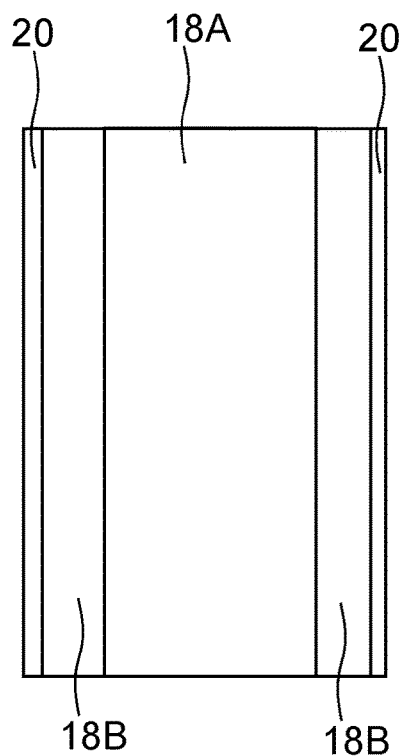

FIG. 17: Side view of a schematic representation of a metal sheet of the outer contact of the ninth embodiment example of the multilayer capacitor.

Figure 18A:
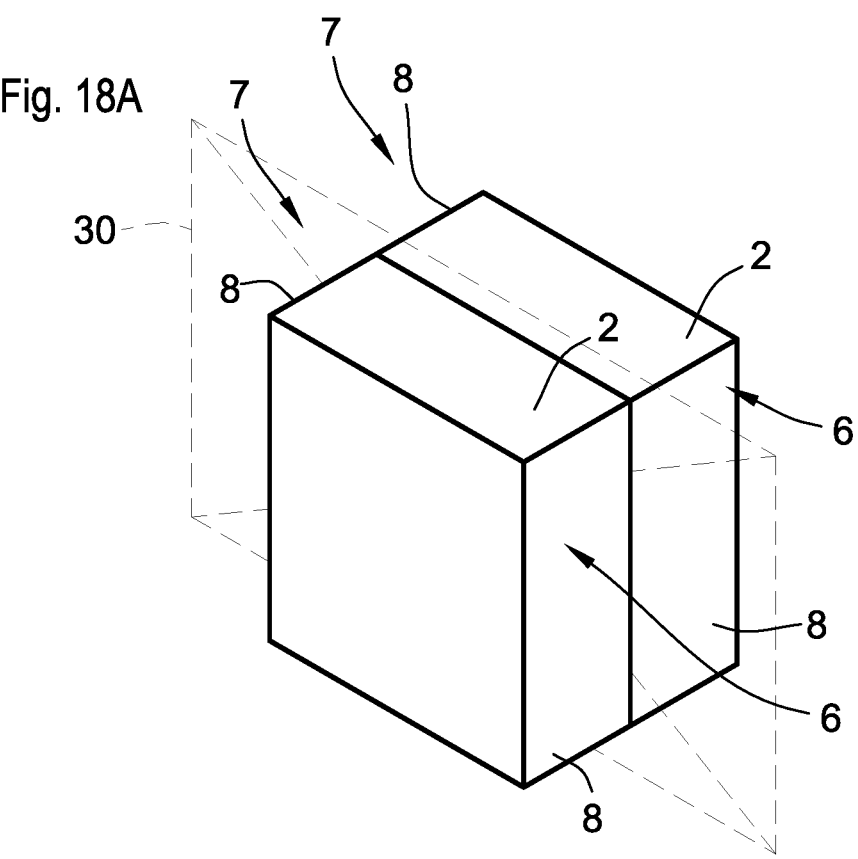

FIG. 18A: Perspective view of two capacitor elements assembled along a contact region.

Figure 18B:
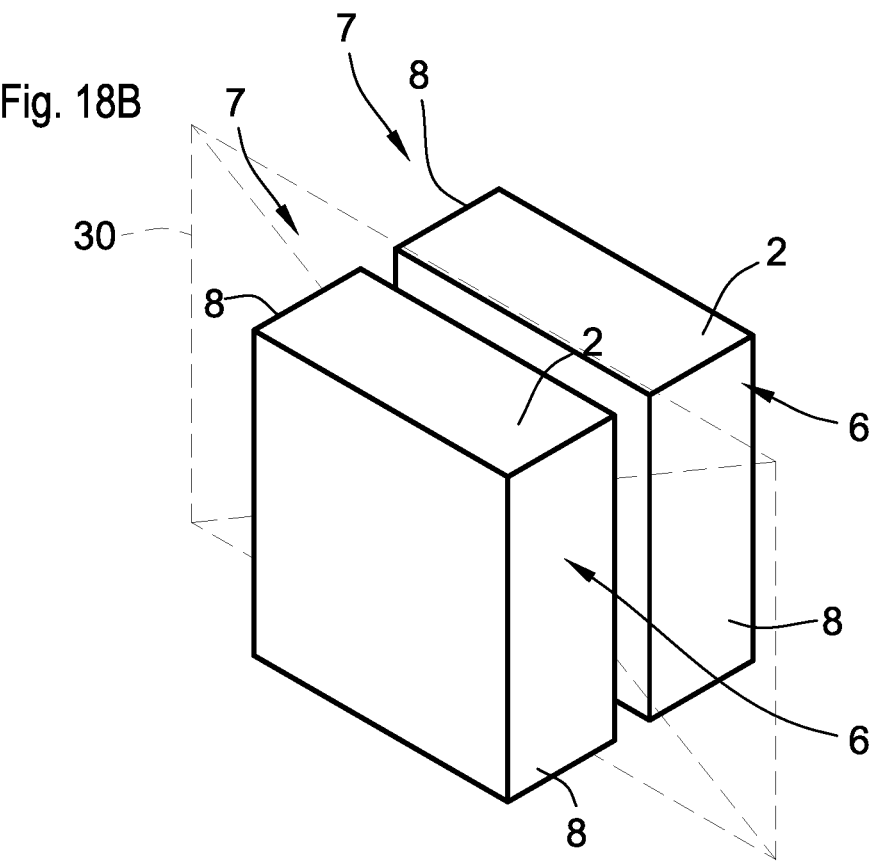

FIG. 18B: Perspective view of the two capacitor elements of FIG. 18A disassembled along the contact region.

FIG. 1 shows a first embodiment example of the multilayer capacitor 1. The figure is essentially limited to the representation of the capacitor element 2. Further components such as the external contacts are not shown in FIG. 1.

The depicted capacitor 1 is constructed analogously to an example of the multilayer capacitor according to the invention, but does not include connection regions and discharge regions.

The capacitor element 2 comprises a stack comprising three first electrodes 3, three second electrodes 4 and dielectric layers 5 arranged between or around these electrodes. The layers are arranged one above the other in a defined stacking direction.

The first electrodes 3 and second electrodes 4 exit the cuboid capacitor element 2 on two opposite sides. These surfaces are called first and second exit surfaces 6/7. The exit surfaces 6/7 are arranged normal to the stacking direction.

At the exit surfaces 6/7, the electrodes belonging together in each case are connected to one another via an electrically conductive outer contact 8. The outer contacts 8 each cover a large part of the exit surfaces 6/7. In other embodiment examples, the outer contacts 8 can also cover smaller parts of the exit surfaces 6/7 or the entire exit surfaces 6/7.

Since the electrodes 3/4 do not extend to the respective opposite exit surface 7/6, two regions to be distinguished arise in the multilayer capacitor 1. In the regions in the center of the capacitor element 2, first and second electrodes 3/4 overlap. These regions are called active regions 9A. At the regions adjacent to the exit surfaces, only first and only second electrodes 3/4 are present, respectively. These regions are called passive regions 9B.

The two side surfaces of the capacitor element 2 normal to the exit surfaces 6/7 and normal to the stacking direction are each adjoined by regions free of electrodes. These regions are also called passive regions 9B (compare FIG. 3).

The overlapping electrodes 3/4 act as a capacitor when an electrical voltage is applied across the outer contacts 8. Due to the voltage between the first and second electrodes 3/4, an electric field then acts in the active region 9A of the multilayer capacitor 1.

It should be noted here that an electric field does not have to be present over the entire stack height in the active regions 9A either. Rather, an electric field is only established between electrodes of different electric polarization, for example in dielectric layers 5 arranged between first and second electrodes 3/4. A field is also built up between inner electrodes and outer contacts in the case of different electrical polarization.

The dielectric layers 5 of the present multilayer capacitor 1 consist of an anti-ferroelectric, ceramic material. In the electric field, polarization of the domains of the crystal structure of the ceramic occurs.

The electrodes are made of an electrically conductive material such as copper, silver, nickel, palladium or platinum.

The polarization leads to a lattice deformation in the ceramic. Due to the lattice deformation, mechanical stresses build up within the multilayer capacitor 1. Due to the low stack height, these mechanical stresses can be neglected in the first example.

The ceramic material of the embodiment example is a perovskite ceramic. A perovskite ceramic generally exhibits anti-ferroelectric properties. Furthermore, by composing the ceramic according to any one of claims 17 to 24, advantageous properties for a capacitor such as high mechanical resistance and high durability can be achieved.

The multilayer capacitor 1 shown in FIGS. 2a and 2b is substantially the same as the multilayer capacitor 1 of the first example.

In the top view in FIG. 3, the side surfaces 10/11 of the capacitor element 2 introduced earlier are also shown normal to the exit surfaces 6/7 and normal to the stacking direction.

In addition to the capacitor shown in FIG. 1, the capacitor in FIGS. 2 and 3 has a second segment, the segments being arranged one above the other in the stacking direction. A single segment of the second embodiment corresponds to the segment of the first example.

The segments are connected via a connection region 12. Relief regions 13 are present within the connecting region 12. Thus, the second example embodiment is an embodiment of the claimed invention. Features and characteristics of the second example corresponding to the multilayer capacitor 1 of the first example are not restated.

The connection region 12 comprises the same dielectric ceramic material as the dielectric layers in the segments 2A and 2B of the capacitor element 2.

The connection region 12 comprises the lowermost dielectric layer of a first segment 2A and the uppermost dielectric layer of a second segment 2B, which are arranged one above the other in the stacking direction. No electrode is located within the connection region 12.

At the edge of the connecting region, a continuous relief region 13 is provided along the entire outer periphery of the capacitor element 2. The relief region 13 is disposed between the lowermost dielectric layer of the first segment 2A and the uppermost dielectric layer of the second segment 2B.

The depth of the relief region 13, measured from the outside of the capacitor element 2 to the innermost location in the capacitor element 2 preferably corresponds to the stack height of a segment.

This ensures that the mechanical stresses due to the deformation of the ceramic in the electric field, do not add up across the segments and thus lead to cracks in the material, for example.

The relief region 13 includes all passive regions 9B of the multilayer capacitor 1, i.e., the relief region 13 is arranged within the connection region 12 in parallel with all sections in the segments that include only one type of electrodes or no electrodes. Furthermore, the relief region 13 partially extends into the active region 9A of the capacitor element 2.

Viewed from the stacking direction, as shown in FIG. 3, the active region 9A has the shape of a rectangle. The passive region 9B forms a rectangular frame surrounding the active region 9A. The relief region 13 forms a rectangular frame that surrounds the passive region 9B and further partially overlaps with the active region 9A.

The relief region 13 is a region in which the stacked dielectric layers 5 are not firmly or only partially bonded to each other.

For manufacturing such a multilayer capacitor 1 according to the second embodiment, ceramic green films comprising a perovskite material are provided for forming the dielectric layers 5. A first paste comprising an organic material is printed on the uppermost green film of the second segment 2B.

A second paste comprising a metallic material is printed on other green films in the desired regions to form the electrodes. The green films are arranged into a stack which is sintered.

The first, organic paste is formed in such a way that, at the points where the first paste is applied, sintering together of the dielectric layers 5 is completely or partially prevented, so that a relief region 13 is formed here.

FIGS. 4 and 5 illustrate a further embodiment example of the multilayer capacitor 1 according to the invention.

Essential features of embodiment example 3 correspond to those of embodiment example 2, and these features are not repeated.

In the present example, in addition to the outer section 13A along the circumference of the capacitor element 2, the relief section 13 comprises an inner section 13B extending between the outer sides, parallel to the exit surfaces 6/7 of the capacitor element 2. The width of this inner section can be varied as desired. In the present embodiment, the width of the inner section exceeds the width of the outer section.

The inner section of the relief region 13 is arranged completely parallel to the active region 9A of the multilayer capacitor 1.

By having such an additional inner section of the relief region 13, addition of the mechanical stresses occurring in the capacitor 1 can be effectively avoided even when the dimensions of the individual layers are large or the stack height is high.

When viewed here in the stacking direction, the relief region 13 has the shape of a rectangular frame whose longitudinal sides are connected by means of a crossbar. The crossbar corresponds to the inner section of the relief region 13.

It should be noted that in the illustrated structure of the third embodiment of the capacitor 1, an unwanted migration of charged particles from the outside to the inside of the capacitor is possible. The charged particles may be, for example, protons present in an outer surface of the capacitor 1 due to moisture. The reason for this is that an electric field can build up in the outermost dielectric layer 5A of the capacitor 1 between the uppermost second electrode 4A and a first external contact. This effect can be further enhanced if the outer contact also covers part of the top surface 1A of the capacitor 1, for example, due to an error in the application.

In FIGS. 6 and 7, a fourth embodiment of the multilayer capacitor 1 is shown, the features of which are partially the same as those of the preceding embodiments. These features will not be explained again.

In contrast to the previous embodiments, the multilayer capacitor 1 in the fourth embodiment comprises third electrodes 14 in addition to first and second electrodes. The third electrodes 14 are internal, so-called floating electrodes, which are not adjacent to the outer surfaces of the capacitor element 2. Thus, the third electrodes 14 are not contacted from the outside.

In contrast to the previous embodiments, the first and second electrodes 3/4 are each arranged in the same layer plane, but are further separated by a dielectric section.

Layer planes comprising the first and second electrodes are arranged between the layer planes comprising the third electrodes 14.

Thus, a multilayer capacitor 1 comprising two capacitors connected in series is formed. A first capacitor 1B formed between the first and third electrodes, and a second capacitor 1C formed between the third and second electrodes.

Between the two active regions 9A of the capacitors 1B and 1C, there is a passive region 9B in which only third electrodes 14 are present, and thus no electrodes of different types overlap.

In the present embodiment, the relief region 13 is designed analogously to the third embodiment. Thus, the relief region 13 includes an outer portion along the circumference of the capacitor element 2 and an inner portion.

Due to the additional inner section, the entire passive region 9B of the capacitor element 2 is further covered by the relief region 13. Further, the relief region 13 also extends into the outer portions of the two active regions 9A of the capacitors 1B and 1C.

Advantageously in the described fourth embodiment, furthermore, no electric field is built up between the outermost first or second electrodes 3A/4A of each segment 2A/2B of the capacitor 1 and the adjacent outer contacts, since they each have the same electric polarization. Thus, even individual layers within the active region 9A do not exhibit an electric field.

Thus, an unwanted migration of charged particles from the outside into the interior of the capacitor 1 can be avoided. Such charged particles may be, for example, protons, which may be present on the outside of the capacitor 1 due to moisture.

FIGS. 8 and 9 show a fifth example of the multilayer capacitor 1. Features corresponding to the previous embodiments are not described again.

The illustrated multilayer capacitor 1 again comprises only first and second electrodes. However, the electrodes have different dimensions. In a first layer plane, first and second electrodes are formed opposite each other, spaced apart by a dielectric section. These first layer planes are analogous to the fourth embodiment.

The first layer planes respectively form the first and last layer planes of each segment. Since the first and second electrodes 3B, 4B each have the same electric polarization as the adjacent outer contacts, no electric field builds up here in the outer portions of the segments 2A/2B or between the two segments.

Reinforcing this is the fact that, unlike electrodes 3A and 4A, electrodes 3B and 4B are also not adjacent within capacitor 1 with electrodes of an opposite electrical polarization. Thus, no electric field builds up in a comparatively larger region. Thus, individual layers within the active region 9A also do not exhibit an electric field.

It is again advantageous in the described embodiment that no electric field is built up between the outermost first or second electrodes 3A/4A/3B/4B of each segment 2A/2B of the capacitor 1 and the adjacent external contacts, since these each have the same electric polarization. Thus, unwanted migration of charged particles from the outside to the inside of the capacitor 1 can be avoided.

This has the advantage of higher resistance to moisture-induced material change.

The distance between the first and second electrode in the first layer plane is at least equal to the thickness of a dielectric layer 5 in the stacking direction. Preferably, the distance is 1.5 to three times this thickness. This can, for example, prevent current flow directly from the first electrode 3B to the opposite second electrode 4A.

The maximum dimension of the electrodes in the first layer plane is predetermined by this distance. The minimum dimension of the same electrodes corresponds to the depth of the passive region 9B along the outer periphery of the capacitor. Preferably, the depth of the electrodes is at least twice this depth.

In addition, there are second layer planes in which only a first electrode 3 is present, and third layer planes in which only a second electrode 4 is present. In these layer planes, the respective electrodes extend almost to the opposite exit surface. The distance of an electrode to the opposite exit surface corresponds to the depth of the passive region along the circumference of the layer planes. These layer planes are analogous to the third embodiment.

Second and third layer planes are arranged alternately one above the other. The dielectric layers 5 are located in between in each case.

The connection region 12 and the relief region 13 are designed as in the previous examples. The relief region 13 includes an outer frame-shaped portion and an inner cross-beam-shaped portion.

The outer passive region 9B and parts of the inner active region 9A are covered by the relief region 13, as shown graphically in FIG. 5.

Unlike the fourth embodiment example, there is no passive region 9B in the center of the capacitor element 2.

FIGS. 10 and 11 show a sixth embodiment example of the multilayer capacitor 1. The individual segments are designed analogously to the fourth embodiment example. However, the sixth embodiment example differs from the fourth embodiment example in the design of the relief regions 13.

While in the fourth embodiment example there is only a single section of the relief region 13B inside the capacitor in addition to the outer section of the relief region 13A, the sixth embodiment example has a plurality of different sections 13B inside. All of these sections 13B are connected to each other, or to the outer section 13A of the relief region. Preferably, they are designed to provide uniform relief of mechanical stresses. The inner sections 13B of the relief region can be arranged parallel to each other or cross each other. The number of sections and their shape and dimensions can be varied as desired.

FIGS. 12 and 13 show another embodiment example of the multilayer capacitor 1. Embodiment example 7 is substantially the same as embodiment example 4, comprising first, second and third electrodes 3, 4 and 14.

In contrast to the fourth embodiment example, fourth, fifth and sixth electrodes 15, 16 and 17 are further formed in the seventh embodiment example. These are dummy electrodes that fill the passive regions 9B without generating active regions 9A themselves.

The fourth and fifth electrodes 15 and 16 are located in the outer passive region of the capacitor elements 2. They are arranged close to the outer contacts and may contact them.

The fourth and fifth electrodes do not generate an electric field because they overlap only with electrodes of the same polarity.

Fourth electrodes 15, which are in contact with the first external contact, overlap only with just such fourth electrodes 15 or first electrodes 3.

Fifth electrodes 16, in contact with the second external contacting, overlap only with equal fifth electrodes 16 or second electrodes 4.

Sixth electrodes 17 are arranged centrally in capacitor element 2 between first and second electrodes 3 and 4, in the same layer planes as first and second electrodes. The sixth electrodes 17 overlap only with other sixth electrodes 17 and third electrodes 14. Since there is thus no overlap of different electrodes of different polarities in this region, this is likewise a passive region 9B of the capacitor element 2. In the present embodiment example, the sixth electrodes are arranged congruently one above the other in the stacking direction.

The distance between the dummy electrodes and the active electrodes perpendicular to the field direction is at least equal to the thickness of a dielectric layer 5, preferably 1.5 to three times the thickness of a dielectric layer 5.

The use of dummy electrodes reduces mechanical stresses and mechanical compression distortion that typically occur between regions with electrodes and regions without electrodes.

The use of dummy electrodes and relief regions can thus minimize mechanical stresses in the multilayer capacitor 1 and increase the robustness of the capacitor. The thermomechanical and electrical load capacity of the multilayer capacitor 1 can thus be optimized.

FIGS. 14 and 15 show an eighth embodiment example of the multilayer capacitor 1, which substantially corresponds to a combination of the fifth and seventh embodiment examples.

In addition to first and second electrodes 3 and 4, fourth and fifth electrodes 15 and 16 are provided along the outer periphery of the electrode layers in the present embodiment example. The fourth and fifth electrodes 15 and 16 are again located in the same layers as the first and second electrodes 3 and 4.

The fourth and fifth electrodes 15, 16 are formed as dummy electrodes analogous to embodiment example 7. They each overlap only with electrodes of the same polarity. The distance between the fourth and fifth electrodes 15, 16 and the active electrodes is preferably 1.5 to three times the thickness of a dielectric layer 5, but at least the thickness of the dielectric layer 5, in order to avoid current flow between active electrodes and opposing dummy electrodes.

Thus, electrodes 15A and 16B in the respective outermost segment layers serve the same purpose as electrodes 3A and 4B in the fifth embodiment, but are designed with a minimum suitable depth.

Since the layers including first and fourth electrodes and second and fifth electrodes always have the same electrode geometry, or the electrodes are arranged only mirrored in each case, the same stencil can be used to print the electrode layers each time.

FIG. 16 shows a ninth embodiment example of the multilayer capacitor 1. The capacitor element 2 can be designed according to one of the previous examples.

Outer contacts 8 are further provided on the exit surfaces of the electrodes 6 and 7. The outer contacts 8 comprise several layers. Sputter layers 8A are deposited directly on the exit surfaces 6/7, covering the entire exit surfaces 6/7. The sputter layer 8A comprises three layers consisting of chromium, nickel and silver.

By the described sputter layers 8A, all first electrodes and all second electrodes, respectively, can be electrically connected to each other and thus be connected in parallel.

Metal sheets 18 for external contacting by means of sintered silver layers 19 are applied to the sputter layers 8A.

The sintered silver layers 19 covering the entire sputter layer 8A hold the sputter layers 8A together in the event of deformation of the capacitor element 2 and prevent, for example, crumbling away from the sputter layers 8A.

In the present embodiment, the silver layer 19 has a thickness of about 20 μm to 30 μm. The porosity of the silver in the layer is 35%.

The silver layers 19 further secure the metal sheets 18 to the sputter layers 8A. Thus, no solder joints are necessary. For this purpose, the silver is applied to the sputter layer and the metal sheets 18 are placed directly thereon. Only after the metal sheets 18 have been placed is the silver layer 19 sintered.

Due to its high electrical conductivity, the silver layer 19 further enables good electrical bonding of the metal sheets 18 to the sputter layers 8A.

To improve the adhesion of the metal sheets 18 to the silver layer 19, the surfaces of the metal sheets 18 in the present example are silver-plated. Preferably, the surfaces are silver plated by electroplating. Thus, an electroplating silver layer 20 is formed on the surface of the metal sheets 18 and is disposed between the metal sheets 18 and the silver layer 19. The thickness of the electroplating silver layer 20 is between 5 μm and 10 μm.

In the present embodiment, as shown in the detailed view in FIG. 17, the metal sheets 18 of the outer contacts comprise two copper layers 18B and an invar layer 18A arranged in between. Instead of invar, the center layer may comprise another iron-nickel or iron-nickel-cobalt alloy.

Because of the center invar layer, the metal sheet 18 has the required mechanical strength. Due to the low thermal expansion of the invar, a mechanical stress build-up during temperature changes can be avoided. Cracking of the outer contact or the ceramic of the capacitor can thus be largely prevented.

Copper layers 18B are applied to the outside of the invar layer 18A, preferably rolled on. The copper layers 18B have a high thermal conductivity and a high electrical conductivity. Thus, an external contact can be provided which, on the one hand, has a low thermal expansion coefficient and thus high mechanical stability and, on the other hand, has high thermal and electrical conductivity.

The copper layers 18B are applied in equal layer thickness on both sides of the invar layer 18A. By applying the copper evenly on both sides, the formation of a bimetallic strip with unfavorable properties related to this application is avoided. The ratio of the layer thicknesses for copper-invar-copper is preferably 1:3:1. In the present example, a metal sheet with a total thickness of 0.15 mm is used. The thickness of the invar layer 18A is 90 μm, and that of the copper layers 18B is 30 μm each.

By using essentially silver and copper in the described layer structure of the external contacts, external contacts with high electrical and thermal conductivity are achieved.

Furthermore, the described layer structure allows the coefficient of thermal expansion to be adjusted, the thermomechanical load capacity and thus the fatigue strength to be increased, and the maximum current carrying capacity to be improved. This leads to optimized failure safety during operation.

The capacitor with the above properties is suitable for use as a DC link or snubber capacitor. Due to the low parasitic sizes, especially the low equivalent series inductance, and the ability of the capacitor to be placed close to a semiconductor, commutation circuits can be kept small. As a result, an induced overvoltage can be well damped in the turn-off process. Due to the properties of the capacitor, it is possible in some applications to dispense with an additional snubber capacitor when used as a DC link capacitor.

Another application of the capacitor described is as a filter capacitor. Due to its high-frequency properties, interference signals can be well attenuated and filtered even far above the operating frequency of a power converter, up into the MHz range.

In another embodiment, not shown, a copper layer is applied to the silver layer 19 instead of the metal sheet 18. In the example, the copper layer has a meandering, grid-like geometry. The copper layer is also silver-plated here. The silver plating is carried out by electroplating. The copper layer is sintered directly to the silver layer.

FIG. 18A shows two separate capacitor elements 2 (each of which may be the capacitor element 2 of any of the embodiments herein) assembled along a contact region 30 that is normal to the layer planes, and normal to the external contacts 8 that are formed on the exit surfaces 6/7. FIG. 18B shows the two capacitor elements 2 of FIG. 18A disassembled along the contact region 30.

LIST OF REFERENCE SIGNS

1 Multilayer capacitor
1A top side of the capacitor
1B first capacitor
1C second capacitor
2 capacitor element
2A,2B segments
3,3A,3B first electrodes
4,4A,4B second electrodes
5 dielectric layers
6 first exit surface
7 second exit surface
8 outer contact
8A sputter layer
9A active region
9B passive region
10,11 side surfaces
12 connection region
13 relief region
13A outer section of relief region
13B inner section of relief region
14 third electrodes
15,15A fourth electrodes
16,16A fifth electrodes
17 sixth electrodes
18 metal sheets
18A invar layer
18B copper layer
19 silver layers
20 Electroplating silver layer

The invention claimed is:

1. A multilayer capacitor comprising a capacitor element having at least two segments, each segment comprising a plurality of layer planes including dielectric layers of ceramics and electrode layers disposed therebetween and stacked in a stacking direction, the electrode layers comprising at least three different types of electrode layers including a first electrode layer wherein first and second electrodes are formed opposite to each other and are spaced apart by one of the dielectric layers, a second electrode layer wherein only first electrodes are formed, and a third electrode layer wherein only second electrodes are formed, the first electrode layers forming outermost electrode layers of each of the at least two segments in the stacking direction, the first and second electrodes overlapping in active regions and not overlapping in passive regions;

wherein the at least two segments are superimposed in the stacking direction;

wherein outermost dielectric layers of the at least two segments form a connection region in which the at least two segments are firmly connected to each other parallel to the layer planes;

wherein the connection region includes a relief region; and wherein the relief region occupies at least the entire passive region of the capacitor.

2. Multilayer capacitor according to claim 1, wherein the relief region is formed as a region between the segments and parallel to the layer planes, in which the segments are not firmly connected to each other.

3. Multilayer capacitor according to claim 1, wherein the relief region is formed as a gap between the segments.

4. Multilayer capacitor according to claim 1, wherein the relief region is pronounced at least in all regions adjacent to outer sides of the capacitor element.

5. Multilayer capacitor according to claim 1, wherein the relief region is at least partially pronounced in an active region.

6. Multilayer capacitor according to claim 1, wherein the relief region has at least one portion that is not adjacent to the outer sides of the capacitor element.

7. Multilayer capacitor according to claim 1, wherein the connecting region comprises a plurality of relief regions delimited from each other.

8. Multilayer capacitor according to claim 7, wherein the mutually delimited relief regions are at least partially not adjacent to the outer sides of the capacitor element.

9. Multilayer capacitor according to claim 1, wherein the first and second electrodes at least partially overlap.

10. Multilayer capacitor according to claim 1, wherein the electrodes comprise copper or silver.

11. Multilayer capacitor according to claim 1, comprising further electrodes arranged in the passive region of the capacitor and not overlapping with any electrodes of a different polarity.

12. Multilayer capacitor according to claim 1, wherein the ceramic is an anti-ferroelectric dielectric.

13. Multilayer capacitor according to claim 1, wherein the ceramic comprises a lead zirconate titanate.

14. Multilayer capacitor according to claim 1, wherein the ceramic comprises a sodium strontium titanate.

15. Multilayer capacitor according to claim 1, wherein the capacitor is applied as a DC link and/or snubber and/or filter capacitor.

16. A multilayer capacitor comprising a capacitor element having at least two segments, each segment comprising a plurality of layer planes including dielectric layers formed of one or more ceramic materials and electrode layers disposed therebetween and stacked in a stacking direction, the electrode layers comprising different electrodes including at least first and second electrodes, the different electrodes overlapping in active regions and not overlapping in passive regions;
  wherein the at least two segments are superimposed in the stacking direction;
  wherein outermost dielectric layers of the at least two segments form a connection region in which the at least two segments are firmly connected to each other parallel to the layer planes;
  wherein the connection region includes a relief region; and
  wherein the relief region occupies at least the entire passive region of the capacitor and comprises a material having an elastic modulus that is different than an elastic modulus of the one or more ceramic materials forming the dielectric layers.

17. A multilayer capacitor comprising separatable capacitor elements each having at least two segments, each segment comprising a plurality of layer planes including dielectric layers of ceramics and electrode layers disposed therebetween and stacked in a stacking direction, the electrode layers comprising different electrodes including at least first and second electrodes, the different electrodes overlapping in active regions and not overlapping in passive region, the capacitor element including two separate external contacts applied to exit surfaces of the capacitor element on which the different electrodes exit, the external contacts contacting at least the first and second electrodes;
  wherein the at least two segments are superimposed in the stacking direction;
  wherein outermost dielectric layers of the at least two segments form a connection region in which the at least two segments are firmly connected to each other parallel to the layer planes;
  wherein the connection region includes a relief region;
  wherein the relief region occupies at least the entire passive region of the capacitor; and
  wherein the separable capacitor elements contact each other at a contact region that is normal to the plurality of layer planes and to the external contacts, and the separable capacitor elements can be assembled and disassembled at the contact region.

18. Multilayer capacitor according to claim 17, comprising at least one third electrode which is not contacted by any of the outer contacts, wherein the third electrode overlaps with the first and the second electrodes.

19. Multilayer capacitor according to claim 17, wherein the external contacts comprise a multilayer sputter layer comprising layers consisting of chromium, nickel and at least one of silver or gold, the layers being deposited on the exit surfaces in that order.

20. Multilayer capacitor according to claim 19, wherein the external contacts comprise metal sheets attached to the sputter layer by means of a solder joint.

21. Multilayer capacitor according to claim 19, wherein the outer contacts comprise metal sheets attached to the sputter layer by a sintered silver layer.

22. Multilayer capacitor according to claim 20, wherein the metal sheets comprise two copper layers and an invar layer disposed therebetween.

23. Multilayer capacitor according to claim 20, wherein the metal sheets comprise a copper layer with meandering geometry.

24. A multilayer capacitor comprising a capacitor element having at least two segments, each segment comprising a plurality of layer planes including dielectric layers of ceramics and electrode layers disposed therebetween and stacked in a stacking direction, the electrode layers comprising different electrodes including at least first and second electrodes, the different electrodes overlapping in active regions and not overlapping in passive regions;
  wherein the at least two segments are superimposed in the stacking direction;
  wherein outermost dielectric layers of the at least two segments form a connection region in which the at least two segments are firmly connected to each other parallel to the layer planes;
  wherein the connection region includes a plurality of relief regions which includes at least two relief regions that are not adjacent to outer sides of the capacitor element and that cross each other; and
  wherein the plurality of relief regions occupies at least the entire passive region of the capacitor.

25. Multilayer capacitor according to claim 24, wherein a first one of the at least two relief regions has a larger dimension in a first direction as compared to a second direction that is perpendicular to the first direction, and wherein a second one of the at least two relief regions has a larger dimension in the second direction as compared to the first direction.

26. Multilayer capacitor according to claim 25, wherein the first direction is parallel to the plurality of layer planes, and the second direction is perpendicular to the plurality of layer planes.

27. Multilayer capacitor according to claim 25, wherein the first direction and the second direction are both perpendicular to the stacking direction.

28. A multilayer capacitor comprising a capacitor element having at least two segments, each segment comprising a plurality of layer planes including dielectric layers of ceramics and electrode layers disposed therebetween and stacked in a stacking direction, the electrode layers comprising different electrodes including at least first and second electrodes, the different electrodes overlapping in active regions and not overlapping in passive regions, the different electrodes further including dummy electrodes in the passive regions that do not overlap with any electrode having a different polarity;
  wherein the at least two segments are superimposed in the stacking direction;
  wherein outermost dielectric layers of the at least two segments form a connection region in which the at least two segments are firmly connected to each other parallel to the layer planes;
  wherein the connection region includes a relief region; and
  wherein the relief region occupies at least the entire passive region of the capacitor.

29. Multilayer capacitor of claim 28, wherein a portion of the dummy electrodes are arranged in electrode layers that include a free-floating electrode not connected to an external contact.

30. Multilayer capacitor of claim 28, wherein a portion of the dummy electrodes are arranged in electrode layers that include one of the first electrodes and one of the second electrodes.

* * * * *